US 8,583,577 B2

(12) United States Patent
Aparin (10) Patent No.: US 8,583,577 B2
(45) Date of Patent: Nov. 12, 2013

(54) METHOD AND APPARATUS FOR UNSUPERVISED TRAINING OF INPUT SYNAPSES OF PRIMARY VISUAL CORTEX SIMPLE CELLS AND OTHER NEURAL CIRCUITS

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 13/115,154

(22) Filed: May 25, 2011

(65) Prior Publication Data

US 2012/0303566 A1   Nov. 29, 2012

(51) Int. Cl.
*G06F 15/18* (2006.01)
*G06F 17/00* (2006.01)
*G06N 3/08* (2006.01)
*G06N 3/063* (2006.01)

(52) U.S. Cl.
USPC .............................................. 706/25; 706/44

(58) Field of Classification Search
None
See application file for complete search history.

(56) References Cited

U.S. PATENT DOCUMENTS

| | | | | |
|---|---|---|---|---|
| 5,771,312 | A * | 6/1998 | Spitzer | 382/167 |
| 7,082,419 | B1 * | 7/2006 | Lightowler | 706/15 |
| 2002/0167615 | A1 * | 11/2002 | Spitzer et al. | 348/679 |
| 2007/0282506 | A1 * | 12/2007 | Breed et al. | 701/45 |
| 2008/0005048 | A1 * | 1/2008 | Weng | 706/14 |
| 2010/0316283 | A1 * | 12/2010 | Greer | 382/155 |
| 2011/0218950 | A1 * | 9/2011 | Mirowski et al. | 706/12 |
| 2012/0011088 | A1 * | 1/2012 | Aparin et al. | 706/25 |
| 2012/0011089 | A1 * | 1/2012 | Aparin et al. | 706/25 |
| 2012/0011093 | A1 * | 1/2012 | Aparin et al. | 706/33 |
| 2012/0330870 | A1 * | 12/2012 | Aparin | 706/19 |

FOREIGN PATENT DOCUMENTS

EP   0652525 A2   5/1995

OTHER PUBLICATIONS

Pellegrino et al, How the Spatial Features of Area V1 Can Be Used for a Nearly Ideal Edge Detection, 2002.*
Lee et al, A Study of Convex/Concave Edges and Edge-Enhancing Operators Based on the Laplacian, 1990.*
Indiveri, A Low-Power Adaptive Integrate-and-Fire Neuron Circuit, 2003.*
Hodgson et al, Biologically Inspired Image Processing, 1995.*
Camunas-Mesa L., et al., "Neocortical frame-free vision sensing and processing through scalable Spiking ConvNet hardware", Neural Networks (IJCNN), The 2010 International Joint Conference on, IEEE, Piscataway, NJ, USA Jul. 18, 2010, pp. XP031771400, ISBN: 978-1-4244-6916-1 the whole document.

(Continued)

*Primary Examiner* — Jeffrey A Gaffin
*Assistant Examiner* — Mikayla Chubb
(74) *Attorney, Agent, or Firm* — Rupit M. Patel (57) ABSTRACT

Certain aspects of the present disclosure present a technique for unsupervised training of input synapses of primary visual cortex (V1) simple cells and other neural circuits. The proposed unsupervised training method utilizes simple neuron models for both Retinal Ganglion Cell (RGC) and V1 layers. The model simply adds the weighted inputs of each cell, wherein the inputs can have positive or negative values. The resulting weighted sums of inputs represent activations that can also be positive or negative. In an aspect of the present disclosure, the weights of each V1 cell can be adjusted depending on a sign of corresponding RGC output and a sign of activation of that V1 cell in the direction of increasing the absolute value of the activation. The RGC-to-V1 weights can be positive and negative for modeling ON and OFF RGCs, respectively.

21 Claims, 6 Drawing Sheets

(56) References Cited

OTHER PUBLICATIONS

Cassidy A., et al., "A combinational digital logic approach to STDP", Circuits and Systems (ISCAS), 2011 IEEE International Symposium on, IEEE, May 15, 2011, pp. 673-676, XP031997721, DOI: 10.1109/ISCAS.2011.5937655 ISBN: 978-1-4244-9473-6, p. 673-p. 676, left-hand column, paragraph 1; figures 1-14.

Choi T. Y. W., et al., "A multi-chip implementation of cortical orientation hypercolumns", Proceedings / 2004 IEEE International Symposium on Circuits and Systems : May 23-26, 2004, Sheraton Vancouver Wall Centre Hotel, Vancouver, British Columbia, Canada, IEEE Operations Center, Piscataway, NJ, May 23, 2004, pp. III-13, XP010719216, ISBN: 978-0-7803-8251-0 pp. III-13-pp. III-16, left-hand column, paragraph 2.

International Search Report and Written Opinion—PCT/US2012/039704—ISA/EPO—Jul. 27, 2012.

Kwan H. K., et al., "Multiplierless Multilayer Feedforward Neural Networks", Proceedings of the Midwest Symposium on Circuits and Systems. Detroit, Aug. 16-18, 1993; Proceedings of the Midwest Symposium on Circuits and Systems[, New York IEEE, US, vol. SYMP. 36, Aug. 26, 1993, pp. 1085-1088, XP000499764, p. 1086, left-hand col.—p. 1087, left-hand column.

Roka A., et al., "Edge Detection Model Based on Involuntary Eye Movements of the Eye-Retina System", Acta Polytechnica Hungarica, vol. 4, No. 1, 2007, Jan. 1, 2007, pp. 31-36, XP55033237, Retrieved from the Internet: URL:http://www.uni-obuda.hu/journal/Roka_Csapo_Resko_Baranyi_9.pdf [retrieved on Jul. 19, 2012]p. 31—p. 44, paragraph 3.

* cited by examiner

METHOD AND APPARATUS FOR UNSUPERVISED TRAINING OF INPUT SYNAPSES OF PRIMARY VISUAL CORTEX SIMPLE CELLS AND OTHER NEURAL CIRCUITS

BACKGROUND

1. Field

Certain aspects of the present disclosure generally relate to neural system engineering and, more particularly, to a method and apparatus for unsupervised training of input synapses of primary visual cortex cells and other neural circuits.

2. Background

Image recognition and motion detection systems can be divided into those based on machine vision (i.e., Artificial Intelligence (AI)) techniques and those utilizing visual cortex techniques (i.e., biologically plausible systems). The machine vision systems have well established methods of training, but poor recognition accuracy. For example, distinguishing a dog from a cat remains a challenging task for machine vision systems with a 50/50 outcome.

On the other hand, biologically plausible systems use a human visual cortex structure. Methods based on these systems promise to be more accurate than the machine vision systems. However, the training methods for biologically plausible systems that lead to their self-organization are not well developed. This is due to a poor understanding of the visual cortex organization and self-training methods.

SUMMARY

Certain aspects of the present disclosure provide an electrical circuit. The electrical circuit generally includes a plurality of Retinal Ganglion Cell (RGC) circuits, wherein each of the RGC circuits generates, at an output, a sum of weighted inputs from receptor circuits associated with that RGC circuit, a plurality of primary visual cortex cell (V1) circuits, wherein each of the V1 circuits generates another sum of weighted outputs of a subset of the RGC circuits, and a circuit configured to adjust weights applied on the outputs for generating the other sum, wherein the adjustment of one of the weights is based on at least one of one of the outputs on which that weight is applied or the other sum.

Certain aspects of the present disclosure provide a method for implementing a neural system. The method generally includes generating, at an output of each Retinal Ganglion Cell (RGC) circuit of a plurality of RGC circuits in the neural system, a sum of weighted inputs from receptor circuits associated with that RGC circuit, generating, by each primary visual cortex cell (V1) circuit of a plurality of V1 circuits in the neural system, another sum of weighted outputs of a subset of the RGC circuits, and adjusting weights applied on the outputs for generating the other sum, wherein the adjustment of one of the weights is based on at least one of one of the outputs on which that weight is applied or the other sum.

Certain aspects of the present disclosure provide an apparatus. The apparatus generally includes means for generating, at an output of each Retinal Ganglion Cell (RGC) circuit of a plurality of RGC circuits in the apparatus, a sum of weighted inputs from receptor circuits associated with that RGC circuit, means for generating, by each primary visual cortex cell (V1) circuit of a plurality of V1 circuits in the apparatus, another sum of weighted outputs of a subset of the RGC circuits, and means for adjusting weights applied on the outputs for generating the other sum, wherein the adjustment of one of the weights is based on at least one of one of the outputs on which that weight is applied or the other sum.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
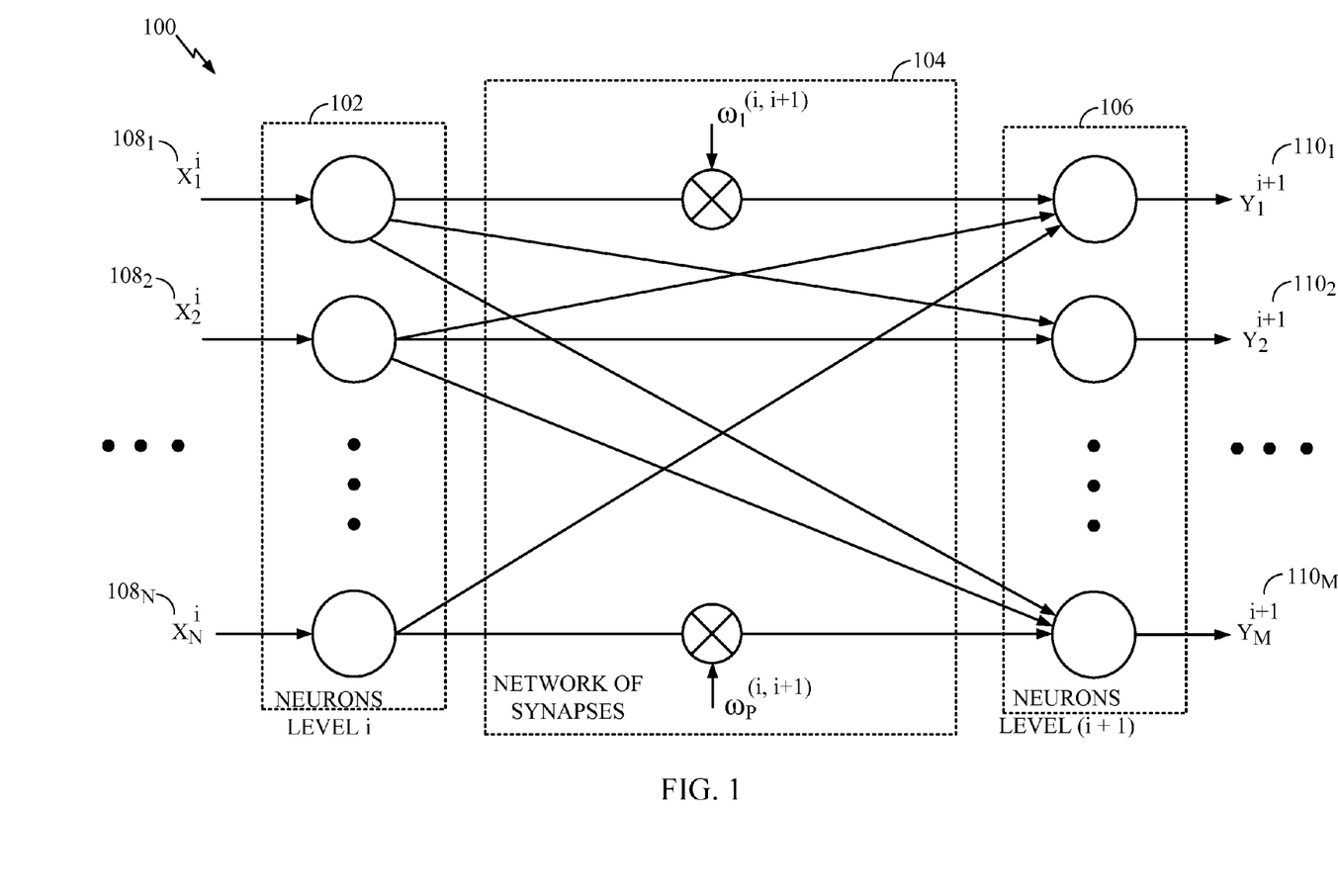
FIG. 1 illustrates an example neural system in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

The present disclosure proposes a simplified structure of primary visual cortex (V1) cells and retinal ganglion cells (RGCs) utilized for color vision, wherein the V1 cells and RGCs may be implemented as neuron circuits of the neural system 100 from FIG. 1. In an aspect of the present disclosure, the RGCs may correspond to the neurons 102, and the V1 cells may correspond to the neurons 106.

V1 input synapses (e.g., the synapses 104 of the neural system 100) may require to be trained in an unsupervised manner to achieve a simple cell emergence. The present disclosure proposes an efficient method of training connectivity between V1 and RGC layers of cells that may lead to an autonomous formation of feature detectors (simple cells) within the V1 layer. The proposed approach may enable a hardware-efficient and biological-plausible implementation of image recognition and motion detection systems.

The proposed unsupervised training method may utilize simple neuron models for both RGC and V1 layers. The model simply adds weighted inputs of each cell, wherein the inputs may have positive or negative values. The resulting weighted sums of inputs is called activations, wherein the activations may also be positive or negative. In an aspect of the present disclosure, the weights of each V1 cell may be adjusted depending on a sign of corresponding RGC output and a sign of activation associated with that V1 cell in the direction of increasing the absolute value of activation. The V1 weights may be positive or negative.

The proposed training method of synapse weights may be suitable for efficient implementation in software and hardware. Furthermore, it may run much faster that the Spike Timing Dependant Plasticity (STDP) training approach.

Unsepervised Training Method of Input Synapses of Primary Visual Cortex Cells

According to certain aspects, RG cells (RGCs) may be divided into ON-cells and OFF-cells. The ON-cells can distinguish objects that are brighter than a background. For example, peripheral vision is all based on ON-cells, so that humans can better see bright spots against a dark background. On the other hand, RG OFF-cells can distinguish objects that are darker than a background. It should be noted that illuminating the entire receptive field comprising both RG ON-cells and RG OFF-cells has a limited effect on an RGC firing rate.

Figure 2:
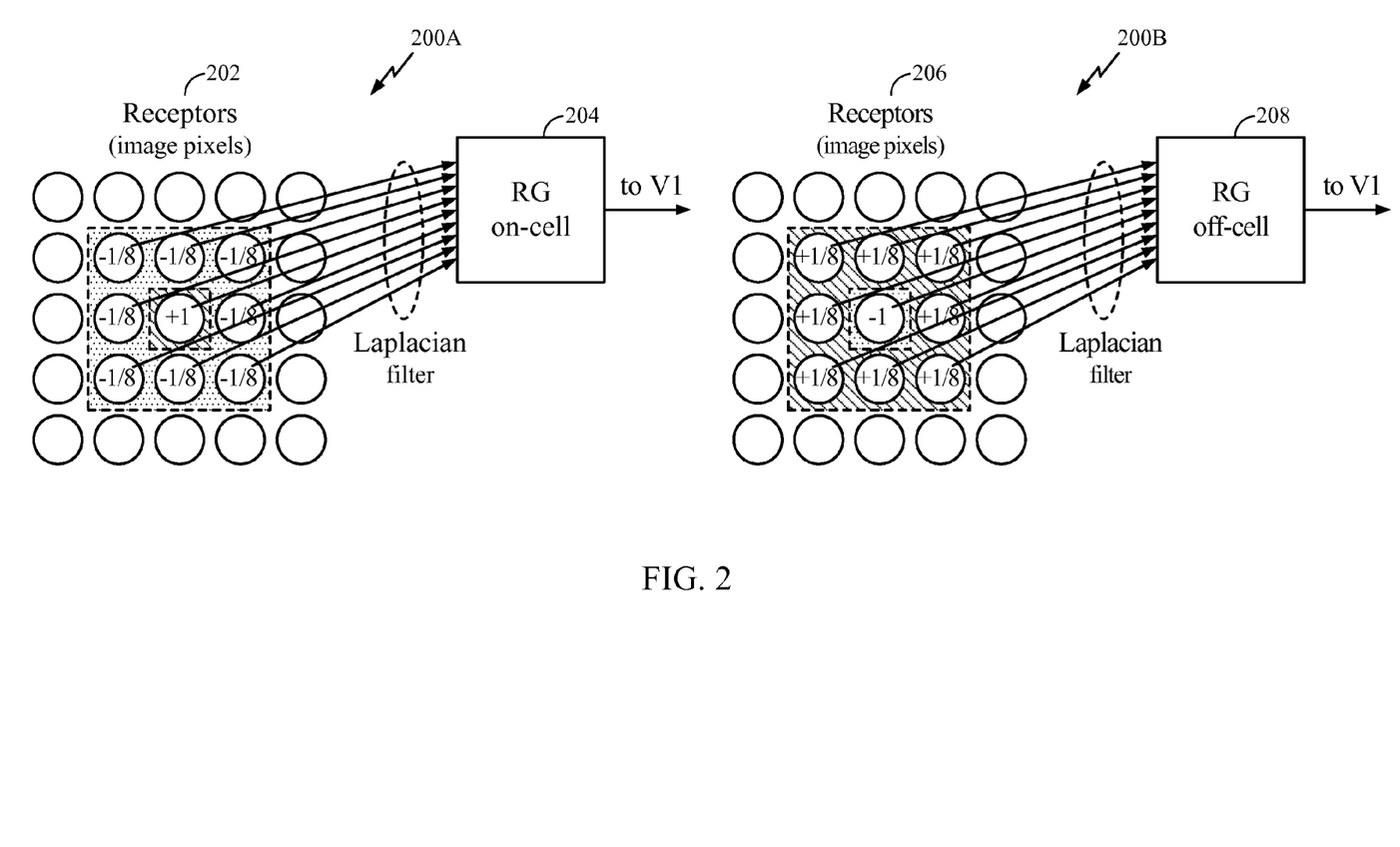
FIG. 2 illustrates an example model of receptors connected with different types of Retinal Ganglion (RG) cells in accordance with certain aspects of the present disclosure.

FIG. 2 illustrates an example model 200a of connection between photo-receptors 202 and an RG ON-cell 204, and an example model 200b of connection between photo-receptors 206 and an RG OFF-cell 208 in accordance with certain aspects of the present disclosure. The receptor circuits 202 and 206 may be organized as orthogonal arrays of image pixels. Therefore, receptive fields of ON- and OFF-cells may have a rectangular shape (instead of circular).

In an aspect, each RGC may receive input from nine receptors, wherein input weights associated with the receptors may form a Laplacian filter (i.e., a Laplacian window function may be applied on signals from the receptors), as illustrated in FIG. 2. The weights may depend on whether the receptors are connected to ON- or OFF-RG cells, as illustrated in the models 200a and 200b. It should be noted that the RG cells 204 and 208 illustrated in FIG. 2 may not correspond to magno-ganglion cells, which are being able to receive inputs from a much larger number of receptors.

Figure 3:
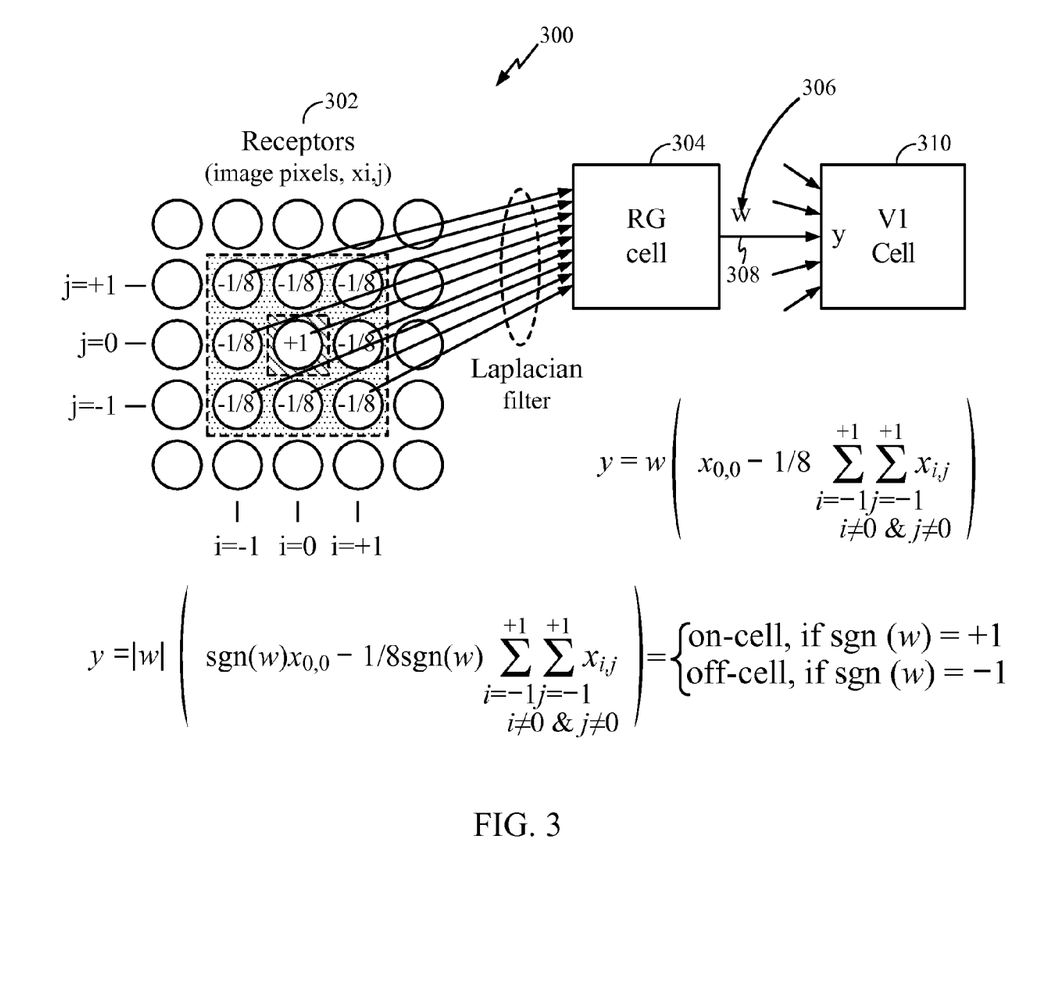
FIG. 3 illustrates an example model of receptors connected with an RG cell that may be ON-cell or OFF-cell depending on a sign of synapse connecting the RG cell and a primary visual cortex (V1) cell in accordance with certain aspects of the present disclosure.

In an aspect of the present disclosure, instead of mixing ON- and OFF-cells in an RGC array, each RG cell (e.g., an RG cell 304 receiving inputs from receptors 302 in a model 300 illustrated in FIG. 3) may be either ON or OFF cell. This may depend on a sign of weight 306 associated with a synapse 308 connecting the RG cell 304 to a V1 simple cell 310.

As illustrated in FIG. 3, an input y of the V1 cell 310 may be obtained by applying a weight w on input signals $x_{i,j}$ from the receptors 302 that may be input into the RG cell 304:

$$y = w \cdot \left( x_{0,0} - 1/8 \cdot \sum_{\substack{i=-1 \\ i \neq 0 \& j \neq 0}}^{+1} \sum_{j=-1}^{+1} x_{i,j} \right). \tag{1}$$

Equation (1) may be rewritten as:

$$y = |w| \cdot \left( \text{sgn}(w) x_{0,0} - 1/8 \cdot \text{sgn}(w) \cdot \sum_{\substack{i=-1 \\ i \neq 0 \& j \neq 0}}^{+1} \sum_{j=-1}^{+1} x_{i,j} \right), \tag{2}$$

wherein if sgn(w)=+1 then the RGC 304 may operate as an ON-cell, and if sgn(w)=−1 then the RGC 304 may operate as an OFF-cell.

Figure 4:
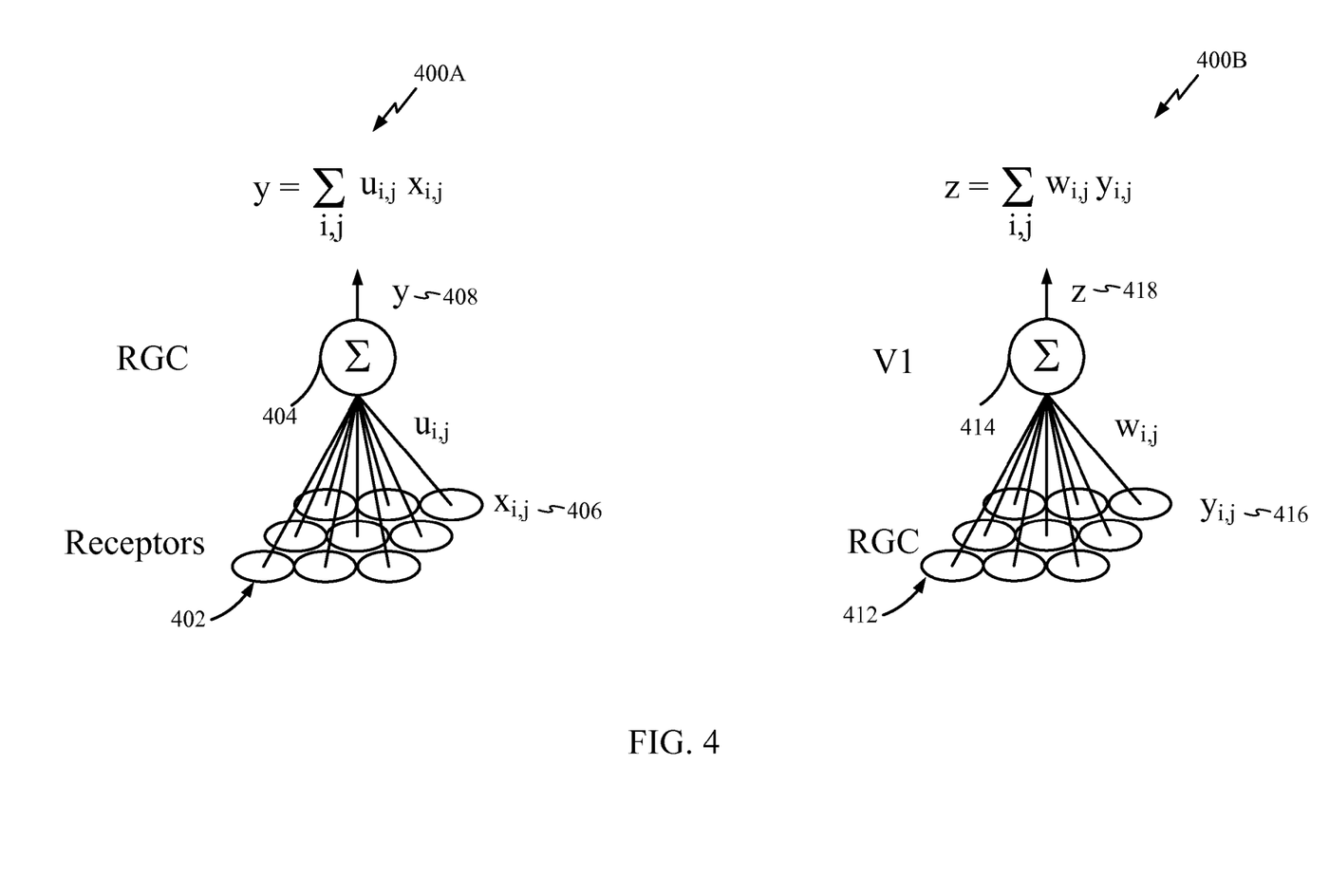
FIG. 4 illustrates an example model of connection between receptors and an RG cell, and an example model of connection between RG cells and a V1 cell in accordance with certain aspects of the present disclosure.

In an aspect of the present disclosure, a neuron model as the one illustrated in FIG. 4 may be utilized. In an example model 400a, an RGC 404 may sum its weighted inputs 406 from receptors 402, and then it may transfer the summation result to its output 408, i.e.:

$$y = \sum_{i,j} u_{i,j} \cdot x_{i,j}. \tag{3}$$

As illustrated in an example model 400b in FIG. 4, a V1 cell 414 may sum its weighted inputs 416 from RGCs 412, i.e.:

$$z = \sum_{i,j} w_{i,j} \cdot y_{i,j}, \tag{4}$$

where each of the weights $w_{i,j}$ from equation (4) may be bipolar for modeling both ON and OFF RGCs. In an aspect, an output 418 (activation signal) of the V1 cell 414 may be compared with a threshold. If the summation result 418 is above the threshold, then the V1 cell 414 is activated (i.e., fires). On the other hand, if the result 418 is below the threshold, then the V1 cell 414 is resting.

In an aspect of the present disclosure, only weights of RGC-to-V1 connections (i.e., the weights $w_{i,j}$) may be trained. The model 400b from FIG. 4 may utilize the following rule. The activation of each V1 simple cell may be calculated as the weighted sum of the corresponding RGC outputs. If the V1-cell activation exceeds a threshold, then the V1 cell may fire. Otherwise, the V1 cell may rest (i.e., the V1 cell does not generate any signal) and its input weights may not change.

First, the activation of each V1 simple cell may be calculated as the weighted sum of the corresponding RGC outputs. Then, the weights of each V1 cell may be adjusted depending on a sign of corresponding RGC output and a sign of activation of that V1 cell activation. In an aspect, if the sign of RGC output and the sign of activation are same, then a positive increment may be added to a weight applied on the RGC output (i.e., the weight may be increased). In another aspect, if the sign of RGC output and the sign of activation are not same, then a positive increment may be subtracted from the corresponding weight (i.e., the weight may be decreased).

For RGC outputs $y_{i,j}$, an activation of V1 cell may be determined as defined by equation (4). Then, in an aspect of the present disclosure, RGC-to-V1 weights may be adjusted as:

$$w_{i,j}^{new} = w_{i,j}^{old} + \text{sgn}(y_{i,j}) \cdot \text{sgn}(z) \cdot |\Delta w|. \tag{5}$$

In another aspect of the present disclosure, the RGC-to-V1 weights may be adjusted based on a value of the activation instead of its sign, i.e.:

$$w_{i,j}^{new} = w_{i,j}^{old} + \text{sgn}(y_{i,j}) \cdot z \cdot |\Delta w|. \tag{6}$$

The value of $|\Delta w|$ from equations (5)-(6) may be predetermined. In an aspect, the value of $|\Delta w|$ may be in the form of $1/2^N$, where N may be an integer. Since the activation value z may be represented as a binary number, the product $z \cdot |\Delta w|$ from equation (6) may be implemented by performing a binary shift operation on the value $|\Delta w|$.

Figure 5:
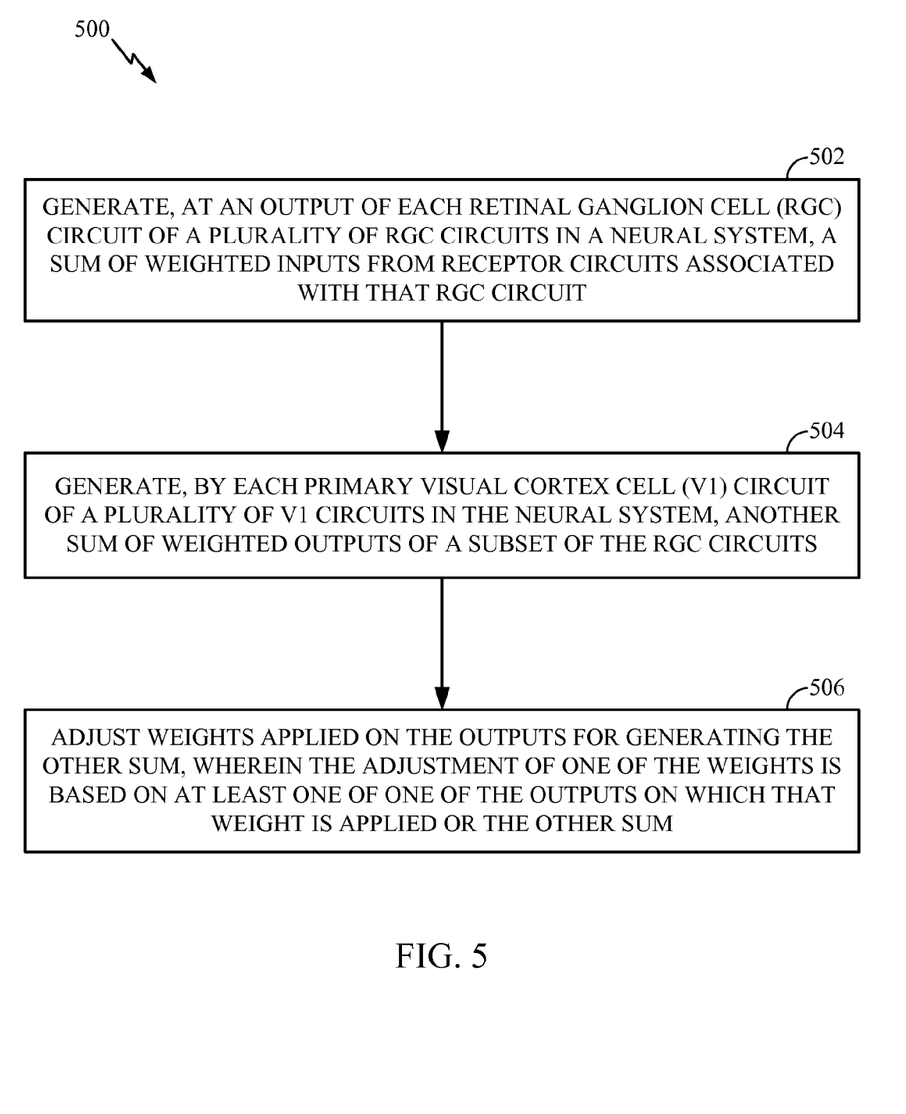
FIG. 5 illustrates example operations that may be performed at a neural system for training of synapse weights between RG cells and a V1 cell in accordance with certain aspects of the present disclosure.

FIG. 5 illustrates example operations 500 that may be performed at a neural system for training of synapse weights between RG cells and V1 cells in accordance with certain aspects of the present disclosure. At 502, at an output of each Retinal Ganglion Cell (RGC) circuit of a plurality of RGC circuits in the neural system, a sum of weighted inputs from receptor circuits associated with that RGC circuit may be generated. At 504, each primary visual cortex cell (V1) circuit of a plurality of V1 circuits in the neural system may generate another sum of weighted outputs of a subset of the RGC circuits. At 506, weights applied on the outputs for generating the other sum may be adjusted, wherein the adjustment of one of the weights may be based on at least one of one of the outputs on which that weight is applied or the other sum.

To summarize, instead of mixing ON- and OFF-cells in the RGC layer, it is proposed in the present disclosure to make them all ON/OFF cells and to control their type through the sign of the RGC-to-V1 weights. Simple "add" neurons may be utilized as RG cells, while "add-and-fire" neurons may be utilized as V1 simple cells, as illustrated in FIG. 4. The proposed learning rule for RGC-to-V1 weights defined by equations (5)-(6) may be applied instead of the STDP learning rule. In an aspect of the present disclosure, the weights may be allowed to change from positive (modeling a connection to ON RG cell) to negative (modeling a connection to OFF RG cell), and vice versa.

Figure 5A:
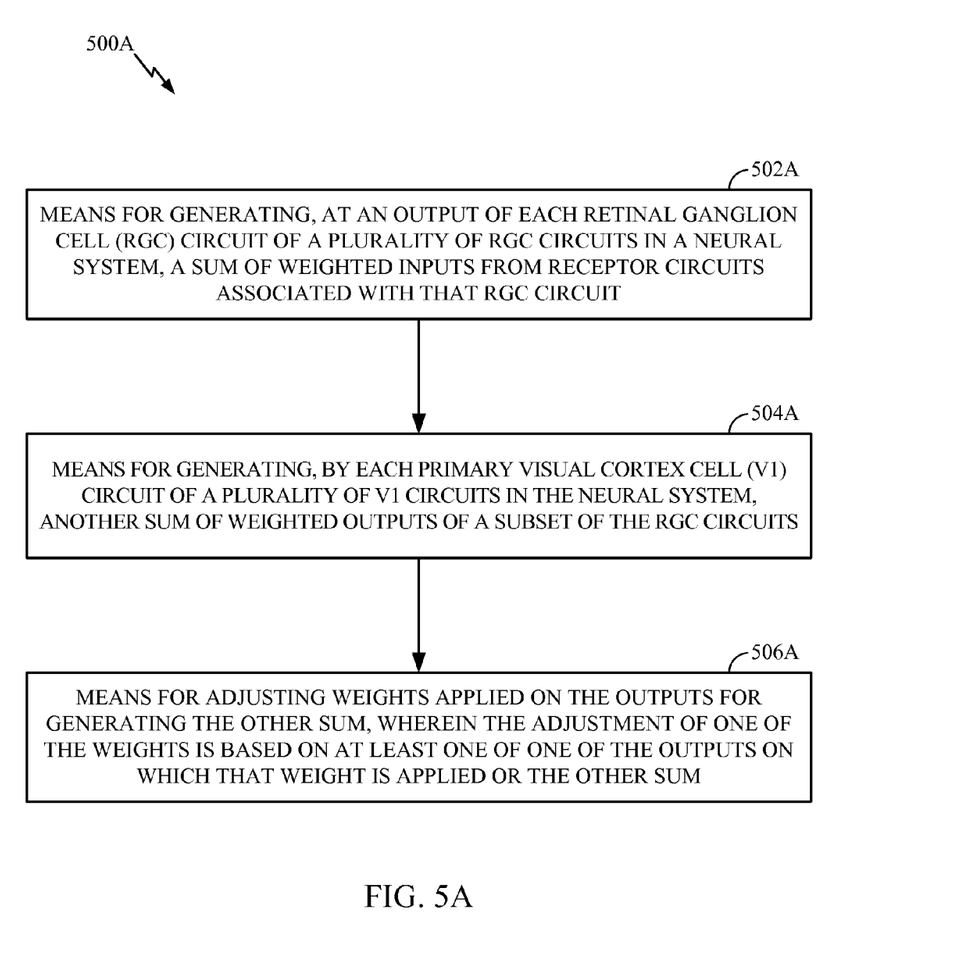
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 illustrated in FIG. 5 correspond to components 500A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An electrical circuit, comprising:
   a plurality of Retinal Ganglion Cell (RGC) circuits, wherein each of the RGC circuits generates, at an output, a sum of weighted inputs from receptor circuits associated with that RGC circuit;
   a plurality of primary visual cortex cell (V1) circuits, wherein each of the V1 circuits generates another sum of weighted outputs of a subset of the RGC circuits; and a circuit configured to adjust weights applied on the outputs for generating the other sum, wherein
the adjustment of one of the weights is based on at least one of one of the outputs on which that weight is applied or the other sum.

2. The electrical circuit of claim 1, wherein the adjustment of that weight is based on a sign of that output and a sign of the other sum.

3. The electrical circuit of claim 1, wherein the adjustment of that weight is based on a sign of that output and a value of the other sum.

4. The electrical circuit of claim 1, wherein:
that weight is increased, if that output and the other sum are both positive or both negative, and
that weight is decreased, if a sign of that output and a sign of the other sum are different.

5. The electrical circuit of claim 1, wherein that V1 circuit outputs a signal, if the other sum generated by that V1 circuit exceeds a threshold.

6. The electrical circuit of claim 1, wherein the circuit is also configured to adjust each of the weights by performing a binary shift operation.

7. The electrical circuit of claim 1, wherein the inputs from the receptor circuits are weighted according to a Laplacian window function.

8. A method for implementing a neural system, comprising:
generating, at an output of each Retinal Ganglion Cell (RGC) circuit of a plurality of RGC circuits in the neural system, a sum of weighted inputs from receptor circuits associated with that RGC circuit;
generating, by each primary visual cortex cell (V1) circuit of a plurality of V1 circuits in the neural system, another sum of weighted outputs of a subset of the RGC circuits; and
adjusting weights applied on the outputs for generating the other sum,
wherein the adjustment of one of the weights is based on at least one of one of the outputs on which that weight is applied or the other sum.

9. The method of claim 8, wherein the adjustment of that weight is based on a sign of that output and a sign of the other sum.

10. The method of claim 8, wherein the adjustment of that weight is based on a sign of that output and a value of the other sum.

11. The method of claim 8, wherein:
that weight is increased, if that output and the other sum are both positive or both negative, and
that weight is decreased, if a sign of that output and a sign of the other sum are different.

12. The method of claim 8, further comprising:
generating a signal at an output of that V1 circuit, if the other sum generated by that V1 circuit exceeds a threshold.

13. The method of claim 8, wherein adjusting each of the weights comprises:
performing a binary shift operation.

14. The method of claim 8, wherein the inputs from the receptor circuits are weighted according to a Laplacian window function.

15. An apparatus, comprising:
means for generating, at an output of each Retinal Ganglion Cell (RGC) circuit of a plurality of RGC circuits in the apparatus, a sum of weighted inputs from receptor circuits associated with that RGC circuit;
means for generating, by each primary visual cortex cell (V1) circuit of a plurality of V1 circuits in the apparatus, another sum of weighted outputs of a subset of the RGC circuits; and
means for adjusting weights applied on the outputs for generating the other sum,
wherein the adjustment of one of the weights is based on at least one of one of the outputs on which that weight is applied or the other sum.

16. The apparatus of claim 15, wherein the adjustment of that weight is based on a sign of that output and a sign of the other sum.

17. The apparatus of claim 15, wherein the adjustment of that weight is based on a sign of that output and a value of the other sum.

18. The method of claim 15, wherein:
that weight is increased, if that output and the other sum are both positive or both negative, and
that weight is decreased, if a sign of that output and a sign of the other sum are different.

19. The apparatus of claim 15, further comprising:
means for generating a signal at an output of that V1 circuit, if the other sum generated by that V1 circuit exceeds a threshold.

20. The apparatus of claim 15, wherein the means for adjusting each of the weights comprises:
means for performing a binary shift operation.

21. The apparatus of claim 15, wherein the inputs from the receptor circuits are weighted according to a Laplacian window function.

* * * * *